D. W. KINGERY.
Harrow.

No. 215,368. Patented May 13, 1879.

Witnesses:
J. W. Garner
W. S. D. Haines

Inventor:
D. W. Kingery
per
F. A. Lehmann,
Atty.

UNITED STATES PATENT OFFICE.

DAVID W. KINGERY, OF CAMDEN, INDIANA.

IMPROVEMENT IN HARROWS.

Specification forming part of Letters Patent No. 215,368, dated May 13, 1879; application filed April 7, 1879.

*To all whom it may concern:*

Be it known that I, DAVID W. KINGERY, of Camden, in the county of Carroll and State of Indiana, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in combining with the harrow a pulverizer, which crushes and breaks the clods at the same time that the harrow-teeth stir them up, and which pulverizer can be detached from the harrow and used separately, as will be more fully described hereinafter.

Figure 1:
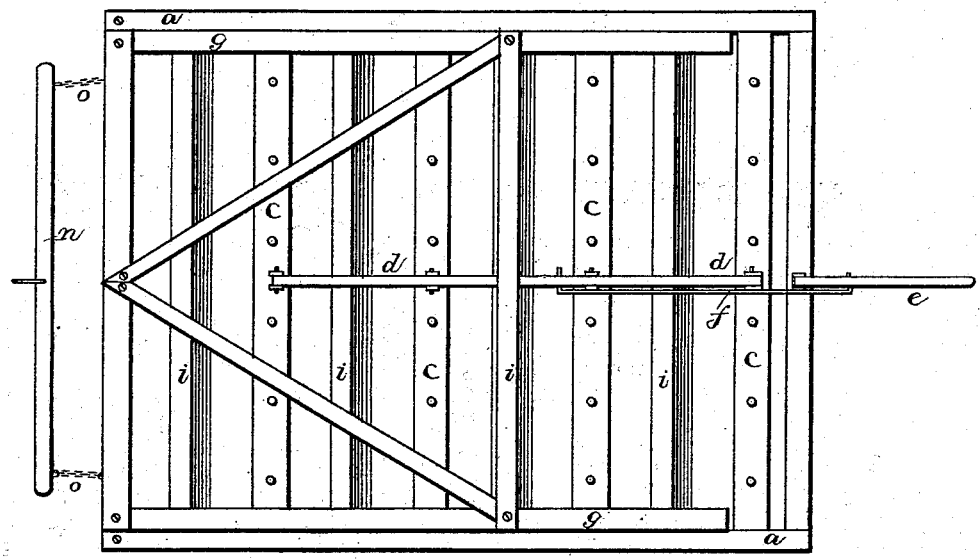
Figure 2:
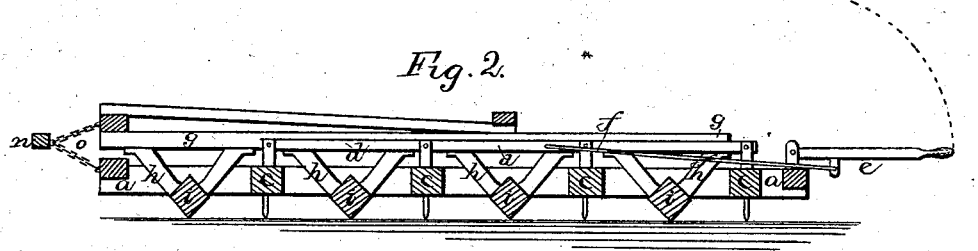

Figure 1 is a plan view of my invention, and Fig. 2 is a vertical section of the same.

$a$ represents the harrow-frame, in which are journaled a number of cross-bars, $c$, through which project the harrow-teeth. These rocking cross-bars are all united together by the connecting-rod $d$, to which is fastened the lever $e$, by means of the rod $f$. By moving the lever forward, the bars $c$ will all be turned in such a manner that the teeth will be inclined backward, so as to free themselves from all trash, and to more easily ride over all obstructions.

Upon the top of this harrow, and held down in position by the rod $d$, is the pulverizer $g$. This pulverizer consists of a rectangular frame, suitably braced, and to the under side of which are fastened the end castings, $h$. Secured in between these castings are the pulverizer-bars $i$, which are so held that their edges alone come in contact with the ground. It will be seen that the harrow-bars $c$ and these pulverizer-bars are placed alternately, so that the pulverizers crush and break the clods and flatten down the surface, while the harrow-teeth come right behind, so as to stir the flattened surface up again.

Both the harrow and pulverizer are fastened by chains $o$ to the double-tree $n$. To remove the pulverizer, when it is desired to use it alone, it is only necessary to unfasten its chains, and then remove the connecting-rod, when it can be raised from off the top of the harrow.

By using the two implements together, as above described, the ground is broken up very finely, and left in a finer and more even condition than can be done in almost any other manner.

Having thus described my invention, I claim—

The combination of the harrow $a$, provided with the cross-bars $c$ and rods $d\,f$, and lever $e$, whereby the cross-bars are made to rock, with the pulverizer $g$, having the castings $h$ and cross-bars $i$, the bars being arranged relatively as described.

In testimony that I claim the foregoing I have hereunto set my hand this 26th day of March, 1879.

DAVID W. KINGERY.

Witnesses:
 WM. LANDIS,
 J. E. NACE.